J. O. WOODRUFF.
Apparatus for Applying Liquids to Casks.
No. 56,483.            Patented July 17, 1866.
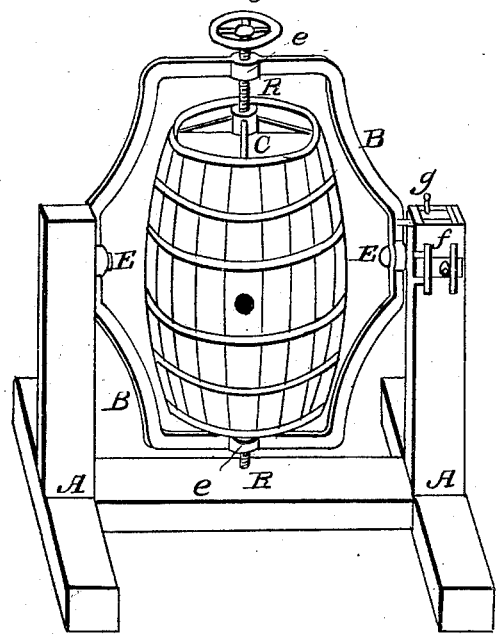
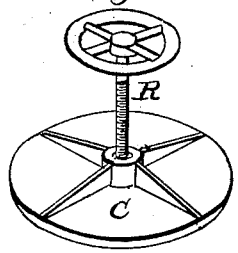
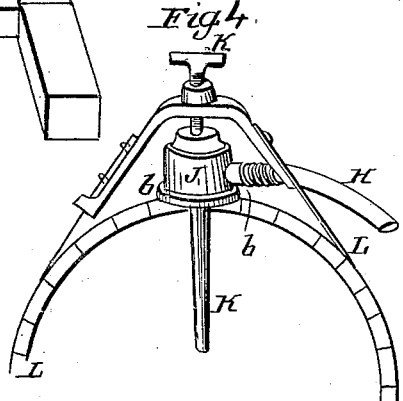
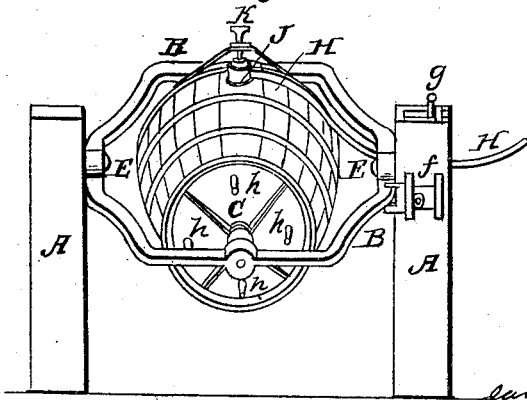
Witnesses            Inventor:
James O. Woodruff

UNITED STATES PATENT OFFICE.

JAMES O. WOODRUFF, OF ALBANY, NEW YORK.

IMPROVED APPARATUS FOR APPLYING LIQUIDS TO CASKS.

Specification forming part of Letters Patent No. 56,483, dated July 17, 1866.

*To all whom it may concern:*

Be it known that I, JAMES O. WOODRUFF, of the city of Albany, State of New York, have invented a new and useful process for applying liquid materials to the interior surface of and throughout the pores of the bodies of casks intended to hold volatile liquids which vaporize at a low temperature—such as mineral oils, turpentine, alcohol, &c.—in order to prevent the loss which occurs by their leakage and evaporation through the pores of the wood, together with an apparatus for effecting the the same; and I declare the following specification, with the drawings forming part thereof, to be a full and complete description of my invention.

The process consists in employing the elastic force of atmospheric air when in a compressed state to a fluid as it is brought into contact with the interior surface of the cask by means of machinery hereinafter to be described, and of which—

Figure 1 represents, in perspective, the machine in a vertical position with a cask placed within it. Fig. 2 represents the machine and barrel in a horizontal position with a part of the forcing apparatus attached. Figs. 3 and 4 represent separate parts of the apparatus.

A is a stout frame having two upright posts, supporting the machinery, which consists of a metal frame, B, large enough, as shown, to receive within it the cask to be operated on, and to allow the operation of the machinery by which the cask is to be secured to it. The frame is pivoted to the posts at the center of its side bars at E, so as to permit it to be turned round vertically upon the pivots.

The machinery for securing the cask within the frame consists of two metal disks, C, to be applied to the heads of the cask. The upper one is shown in Fig. 1, and enlarged in Fig. 3, and the lower one in Fig. 2. They are attached to screw rods or stems R by ball-sockets, so as to permit the disks to turn freely on the rods. The screw-threads of the rods are fitted to corresponding female screws formed in the frames at *e*, in order to allow the disks to be approached to or separated from each other.

To place the cask within the frame, the frame is secured in a vertical position by a bolt, *g*. Then the disks are screwed back, so as to pass the cask between them and place it upon the lower disk. Then the upper one is screwed down until the cask is so firmly held that the frame can be turned over without shifting its position within it.

The forcing apparatus consists of a reservoir (not shown in the drawings, because not claimed) of any suitable material and dimensions, and strong enough to hold air compressed to a pressure of from ten to thirty pounds to the square inch. From it a flexible tube, H, proceeds, terminated by a metal nozzle, J, whose form is shown on an enlarged scale in Fig. 4, made to fit over the bung-hole of the cask, with a washer, *b*, of leather, india-rubber, or other suitable material fitted to it, so as to close the hole air-tight. From this upper part a tube, *k*, projects down into the cask far enough to prevent the liquid applied to the cask from entering the tube J when the cask is turned over, as hereinafter described.

The nozzle J is held down so as to resist any pressure of air from within the cask by means of a thumb-screw, K, passing through a loose hoop, L, (see Fig. 2,) which is fitted to the shape of the cask, excepting at that part which passes over the bung-hole, where it is arched upward to make room for the nozzle and screw. It will be seen that when K is screwed down, drawing the hoop against the cask, it will hold J against any pressure from the condensed air that the hoop can resist.

The mode of operating the apparatus is this: The cask is first warmed internally by any convenient process. It is then secured, as described, by the disks within the frame B. The frame is now placed as shown in Fig. 2 and secured by bolt *f*. The liquid to be applied is then poured in at the bung-hole to a few inches of depth. The hole is then closed by the nozzle J, as described. The air-reservoir, with which tube H communicates, having been charged with air of suitable pressure, a communication is opened through the tube between it and the cask. Then the frame, with the cask, is rocked backward and forward upon its pivots E, so that the liquid shall be applied to both heads of the cask and at intervals, the frame being held horizontally, as in Fig. 2. The cask is to be rotated upon the rods R, (for which purpose pins or handles *h* project from the lower disk,) so as to bring the entire surface of the staves alternately under the liquid. By this process every portion of the internal surface of the cask will be brought into contact with the lining material, which, under the pressure of the compressed air, will be forced into every pore of the cask. The surplus fluid being then emptied out, the work is done.

The warming of the cask is not essential to the process, but facilitates the operation of injection by opening the pores of the wood for the reception of the liquid.

I am aware that condensed hot air has been used to cause liquids to penetrate into the pores of casks, and I disclaim its use for that purpose; but What I do claim, and desire to secure by Letters Patent, is—

1. The process for applying liquids to the interior of casks so as to penetrate into the pores of their bodies by the employment of condensed air, cold, or at the temperature of the atmosphere, as described.

2. The apparatus described in the within specification to effect the process of forcing liquids into the pores of cask-bodies—that is, the frame B, suspended on its axes E, the disks C, with their screw-rods R, the flexible tube H, with its nozzle J, and tube K, substantially as described, and for the purposes set forth.

JAMES O. WOODRUFF.

Witnesses:
RICHD. VARICK DE WITT,
J. W. ROSSEN.